Feb. 8, 1966  R. NEUSCHOTZ  3,233,258
MANUFACTURE OF KNURLED THREADED ELEMENTS
Filed June 6, 1963  2 Sheets-Sheet 1

ROBERT NEUSCHOTZ
INVENTOR.

BY William P. Green
ATTORNEY

Feb. 8, 1966  R. NEUSCHOTZ  3,233,258
MANUFACTURE OF KNURLED THREADED ELEMENTS
Filed June 6, 1963  2 Sheets-Sheet 2
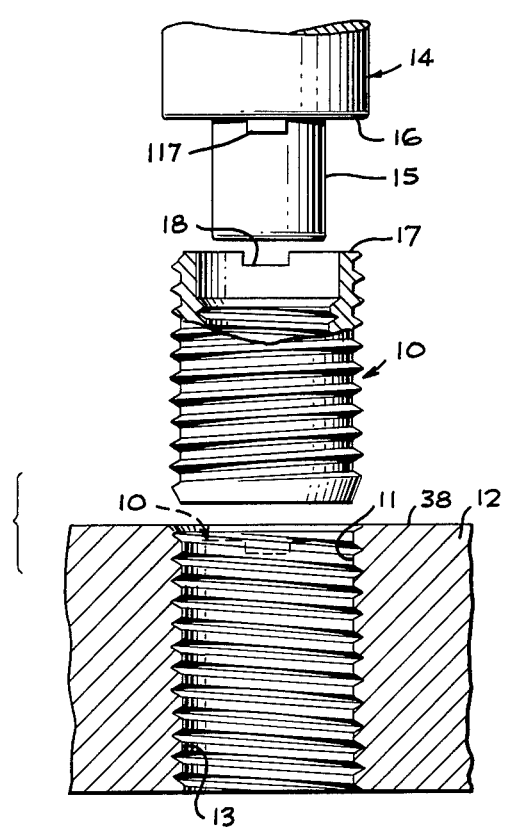
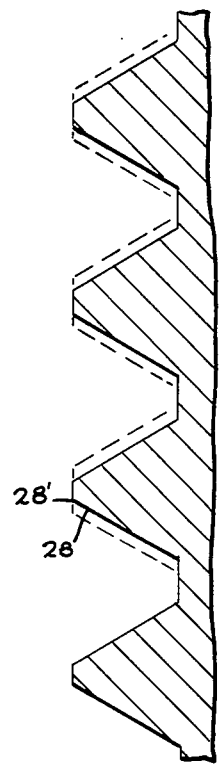
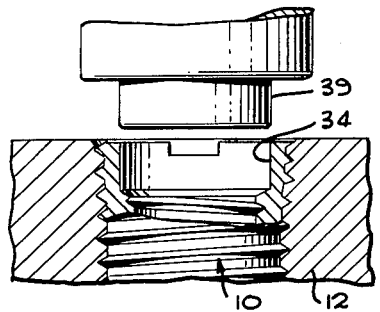
INVENTOR.
ROBERT NEUSCHOTZ
BY William P. Green
ATTORNEY

# United States Patent Office 3,233,258
Patented Feb. 8, 1966

3,233,258
MANUFACTURE OF KNURLED THREADED
ELEMENTS
Robert Neuschotz, 1162 Angelo Drive,
Beverly Hills, Calif.
Filed June 6, 1963, Ser. No. 286,122
2 Claims. (Cl. 10—86)

This invention relates to an improved process for manufacturing threaded elements having locking serrations for retaining the elements in a carrier part. Certain structural features of the threaded element itself, formed by the present process, are covered in my co-pending application Serial Number 271,717, filed April 9, 1963 on "Structure and Installation of Knurled Locking Threaded Element."

The elements with which the present invention is concerned are of a general type having an external thread adapted to be screwed into a mating internal thread in a carrier part, with a portion of the external thread being knurled to form serrations thereon. In use, the element is screwed into the carrier part, and the serrated threads are then expanded radially outwardly to lock the element against removal. In most instances, the threaded element takes the form of an insert having internal threads, in addition to its external threads, so that a stud or bolt may be connected into the insert.

In using most prior inserts of this general type, the carrier part has been so designed as to provide a counterbore within which the knurled portion of the insert is received in its fully installed condition. The serrations are then expanded against this counterbore in locking relation. Inserts made in accordance with the present method, on the other hand, are so designed that the knurled portion of the insert thread may actually be screwed directly into the internal thread in the carrier part, rather than into a counterbore, to attain an increased locking effectiveness by virtue of engagement of the serrations with the carrier part threads over a greater area than is possible where serrations engage a counterbore. When the serrations are expanded outwardly against mating threads, these threads contact the serrations throughout a relatively extended radial distance, rather than at simply the peaks of the serrations as occurs when the serrations are expanded against a counterbore.

A major object of the invention is to provide a method for so forming the serrations of an insert of the above discussed type that they may be screwed into engagement with the carrier part thread with very little installing torque, so that a user may employ a type of installing tool which is capable of applying only limited torque to the insert. Thus, the insert may be screwed into position very easily, and if desired, by a simple hand tool, to then be expanded against the carrier part and lock the insert against removal.

The process of knurling an external thread on an insert or other threaded element necessarily results in axial spreading of the material of the knurled thread in a manner such that the formed serrations are thicker axially than the initial threads. Consequently, such a knurled thread cannot be screwed into a mating carrier part thread with the facility desired by the present invention. To overcome this difficulty, where a low torque type of installing tool is to be employed, the present process includes the steps of first knurling a portion of the insert thread, with resultant axial spreading or thickening of the thread to form thickened serrations, and then removing portions of the axially spread material from the serrations to reduce their axial thickness to a value closer to the initial dimensions of the threads, and preferably within the confines of the initial thread profile.

Additional features of the invention relate to a particular unique process for facilitating removal of the axially spread material of the serrations by means of a conventional thread forming tool or "chaser." In this connection, it is noted that, after a thread has been knurled, it is very difficult, and for practical purposes almost impossible, to screw a thread chaser onto the knurled portion of the thread, when that portion is at the only exposed end of the insert, as is the case in manufacture of the present elements. To overcome this difficulty, the present process includes the steps of first threading the insert body, then knurling a portion of the thread at a location spaced inwardly from both of its ends, leaving unknurled portions of the thread at both ends, next screwing a thread chaser onto one of the unknurled portions of the thread, as a guide, and then onto and past the serrations themselves, and ultimately removing that unknurled portion after it has been used for the discussed guiding purpose. In this way, the chaser is effectively directed onto and past the distorted knurled area of the thread, to cut away the excess material of the serrations to the initial thread profile, or to a size slightly greater than that initial profile, if desired.

The above and other features and objects of the invention will be better understood from the following detailed description of the typical embodiment illustrated in the accompanying drawing in which:

FIG. 5 illustrates the final completed insert formed by the present process;

FIG. 6 is an enlarged fragmentary section taken essentially axially through the peaks of the serrations of the FIG. 5 device;

FIG. 7 is a section similar to FIG. 6, but taken through an intermediate more shallow portion of one of the serrations;

FIG. 8 shows a tool for expanding the insert to locking condition after installation in a carrier part.

Figure 1:
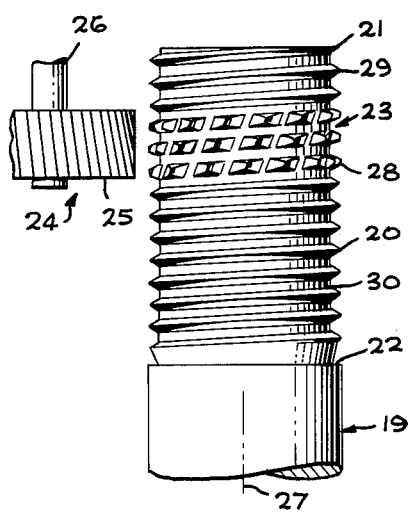
FIG. 1 is a side elevation showing an early step of a thread forming process embodying the invention.

With reference first to FIG. 5, there is shown at 10 a finished insert manufactured by the present process, and adapted to be screwed into a bore 11 in carrier part 12. Bore 11 has internal threads 13 which may be of uniform diameter along substantially the entire extent of the bore. The insert is screwed into position within the carrier part by means of an installing tool 14 having a shank 15 adapted to project into the insert, and having a shoulder 16 bearing against the upper end 17 of the insert. Shoulder 16 carries a pair of diametrically opposed driving lugs or teeth 117, projecting axially beyond shoulder 16, and adapted to fit within a pair of diametrically opposed notches 18 formed in the upper end of insert 10, to rotatively key the insert to the driving tool during an installing operation.

To now discuss the manner of formation of insert 10, reference is made first of all to FIG. 1, which illustrates at 19 an elongated initially straight cylindrical piece of metal bar stock, typically steel, from which a series of the inserts are successively formed. In FIG. 1, an end part of this bar stock has been externally threaded, to form threads 20 extending from the transverse end surface 21 to a point 22. The thread 20 is of uniform diameter along its entire extent, and is somewhat longer than the ultimate insert 10 which is to be formed. Alternatively, the bar stock may be threaded along its entire length in one operation and before any other steps are performed.

After threading of the bar stock, a portion 23 of the thread 20 is knurled, by means of a knurling tool 24 having an irregularized knurling wheel 25 mounted to turn about a shaft 26 disposed parallel to the main axis 27 of the stock. As the stock 19 is power driven rotatively about axis 27, the knurling tool is pressed radially inwardly against portion 23 of the thread, to form the desired serrations 28 on the thread. The knurled area 23 should include at least one complete turn of the thread about axis 27, and preferably a plurality of turns, for best results as much as three turns. As will be apparent from FIG. 1, the knurled area is spaced inwardly from exposed end 21 of the stock a substantial distance, through desirably at least one and preferably a plurality of turns, to leave an unknurled portion 29 of the thread. Also, the knurled area is spaced a greater distance from the location 22 which is ultimately to be the axially inner end of the complete insert, to leave an extended unknurled area 30 at that location.

Figure 2:
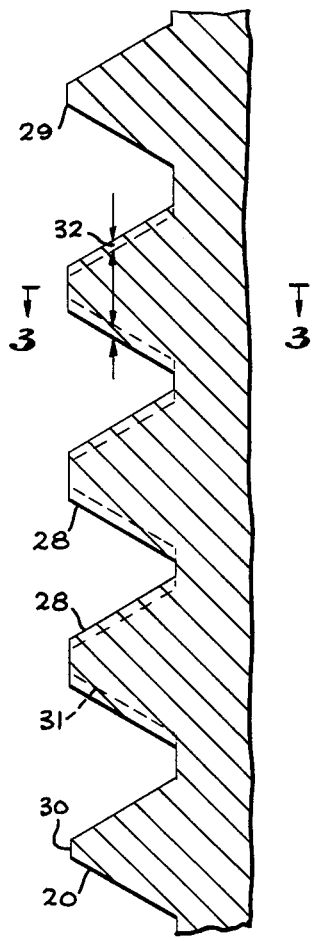
FIG. 2 is an enlarged fragmentary axial section through a portion of the thread of FIG. 1.

The knurling of area 23 in the discussed manner causes substantial axial spreading of the material of the thread at the locations of the formed serrations 28. This spreading is illustrated in FIG. 2, in which the unknurled threads are represented at 29 and 30, above and beneath the axially thickened serrations 28. At the serration locations, the initial profile of the thread 20 is illustrated in broken lines at 31, to show that the material of the serrations has been spread or thickened axially the amount designated 32. Thus, these serrations could not easily be screwed into engagement with threads 11 of the carrier part in this spread condition, without the exertion of excessive installing torque.

Figure 4:
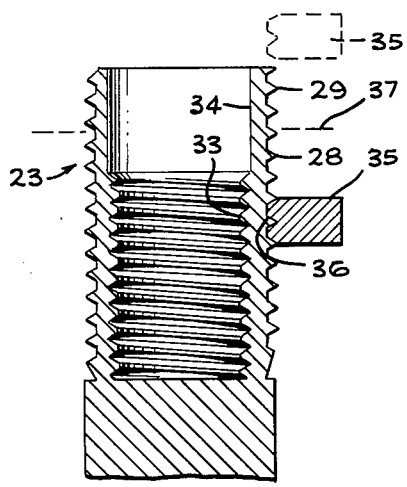
FIG. 4 illustrates the insert of FIG. 1 after certain further steps have been performed on it.

After the insert has reached the condition of FIGS. 1 and 2, the insert may be internally bored and tapped to the condition of FIG. 4, to provide an internal thread 33 and an internal counterbore 34 radially opposite serrations 28. Also, and of critical importance to the present process, the knurled area is chased by a conventional thread chaser 35, or other thread shaping tool, to remove the excess axially spread material from the knurled area. More specifically, the thread chaser 35, having thread cutting teeth represented at 36, is first located in the broken line position of FIG. 4, and is then advanced axially, and simultaneously rotated (or the stock is rotated) to screw the thread chaser into engagement with and along the unknurled outer end thread area 29 of the insert body. Since this portion of the insert thread has not been knurled, the chaser can advance easily onto it, and then continue to screw onto and past the knurled area 23. Cutting teeth 36 of the chaser are designed to cut away the serrations to a size corresponding more closely to their initial thread profile 31 of FIG. 2. The chaser may then be removed from the work part, following which end portion 29 of the work piece is cut off in the plane 37 of FIG. 4, with notches 18 then being milled in the end surface of the insert. The final step is of course to cut off the entire insert at the location 22 of FIG. 1, to complete the element illustrated in FIG. 5.

Figure 3:
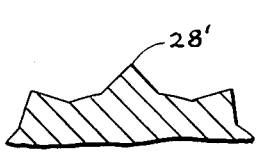
FIG. 3 is a fragmentary section taken on line 3—3 of FIG. 2.

FIG. 6 is a view similar to FIG. 2, but illustrating in enlarged form the ultimate axial cross sectional configuration of the serrations 28, after the thread chaser has reduced these serrations from the thickened condition illustrated in broken lines in FIG. 6 to the full line final cross section corresponding to the cross section or profile of the unknurled portions of the threads. FIG. 7 is a similar view, but showing the ultimate cross section of the serrations at a location where the material has been more deeply serrated, that is, at locations offset from the peaks 28 of FIG. 3. After a first insert 10 has been formed in the discussed manner from an end portion of bar stock 19, the next successive portion of the stock is threaded, knurled, etc., to form another insert, so that a series of the inserts may be successively machined very rapidly from the plain stock.

To install the insert 10, the insert is first placed about shank 15 of tool 14, and the tool is then actuated to screw the insert into bore 11 of the carrier part, to the broken line position of FIG. 5. During such installation, surface or shoulder 16 of the tool bears downwardly against end surface 17 of the insert, and shallow rectangular teeth 117 fit within correspondingly shaped notches 18 in the insert to transmit rotary motion from the tool to the insert. When the tool reaches a position at which shoulder 16 engages the outer surface 38 of the carrier part, further axially inward movement of the tool is arrested, so that continued rotation of the tool causes the insert to advance inwardly just far enough to move notches 18 out of engagement with teeth 117, and thereby break the rotary driving engagement between the tool and insert. The insert is thus automatically installed in the broken line position of FIG. 5, at which position further rotation of the tool is no longer effective to turn the insert.

After the insert has been screwed to the broken line position of FIG. 5, tool 14 is removed axially from the insert, and an expanding tool or punch 39 (FIG. 8) is driven or forced axially into counterbore 34 of the insert. This tool 39 is slightly larger in diameter than bore 34, to expand the serrated portion of the insert radially outwardly, and cause the serrations to bite into and deform the material of the carrier part in a manner effectively locking the insert against removal.

In the process of the invention as illustrated in the drawings, thread chaser 35 is typically shown as reducing the serrations to a size corresponding exactly to the initial thread profile (see FIG. 6), so that the knurled portion of the insert may be easily screwed into the carrier part with very little installation torque. It is contemplated, however, that in some instances this method may be altered slightly by so shaping the thread chaser that, though it does cut off most of the axially enlarged portion of the serrations (32 in FIG. 2), it does not remove this portion completely, but instead leaves the ultimate serrations very slightly larger axially than the initial thread profile, so that there will be a slight binding effect between the insert and carrier part for holding the insert against accidental dislocation prior to the expanding operation.

What is claimed as new is:

1. The method of forming a knurled threaded element that includes forming an external thread on a body, knurling a first portion of said thread intermediate the ends of the thread, to form circularly spaced serrations on said first portion, while leaving second and third portions of the thread unknurled at opposite axial sides of said first portion, spreading the material of said first portion of the thread axially by said knurling so that said serrations are axially thicker than the initial thread and than said unknurled second and third portions of the thread, relatively moving said body and a threading tool to screw said tool onto said third portion of said thread, continuing said relative movement to advance said tool onto said knurled first portion of thread, cutting away the axially spread material of said serrations by said threading tool to a reduced axial thickness corresponding approximately to the initial thickness of the thread, and at some time during the method forming a passage in the body having a portion within said serrated first portion of the thread, and forming a second thread on the body different than the first thread for engaging a mating part.

2. The method of forming a knurled threaded element that includes forming an external thread on a body, knurling a first portion of said thread intermediate the ends of the thread, to form circularly spaced serrations on said first portion, while leaving second and third portions of the thread unknurled at opposite axial sides of said first portion, spreading the material of said first portion of the thread axially by said knurling so that said serrations are axially thicker than the initial thread and than said unknurled second and third portions of the thread, relatively moving said body and a threading tool to screw said tool onto said third portion of said thread, continuing said relative movement to advance said tool onto said knurled first portion of the thread, cutting away the axially spread material of said serrations by said threading tool to a reduced axial thickness corresponding approximately to the initial thickness of the thread, then removing from the body the art thereof carrying said third portion of the thread, and at some time during the method forming a passage through said body having internal threads within the part of the body which carries said second portion of the external thread, and having a counterbore within the part of the body which carries said first portion of the external thread.

References Cited by the Examiner

UNITED STATES PATENTS

| | | | |
|---|---|---|---|
| 1,914,696 | 6/1933 | Le Fever | 151—22 |
| 2,096,937 | 10/1939 | McManus | 151—22 |
| 3,069,960 | 12/1962 | Baubles | 85—1 |
| 3,076,208 | 2/1963 | Moore | 151—22 |
| 3,163,872 | 1/1965 | Rosan et al. | 10—10 |

FOREIGN PATENTS 840,759   7/1960   Great Britain.

ANDREW R. JUHASZ, *Primary Examiner.*